United States Patent Office 3,259,673
Patented July 5, 1966

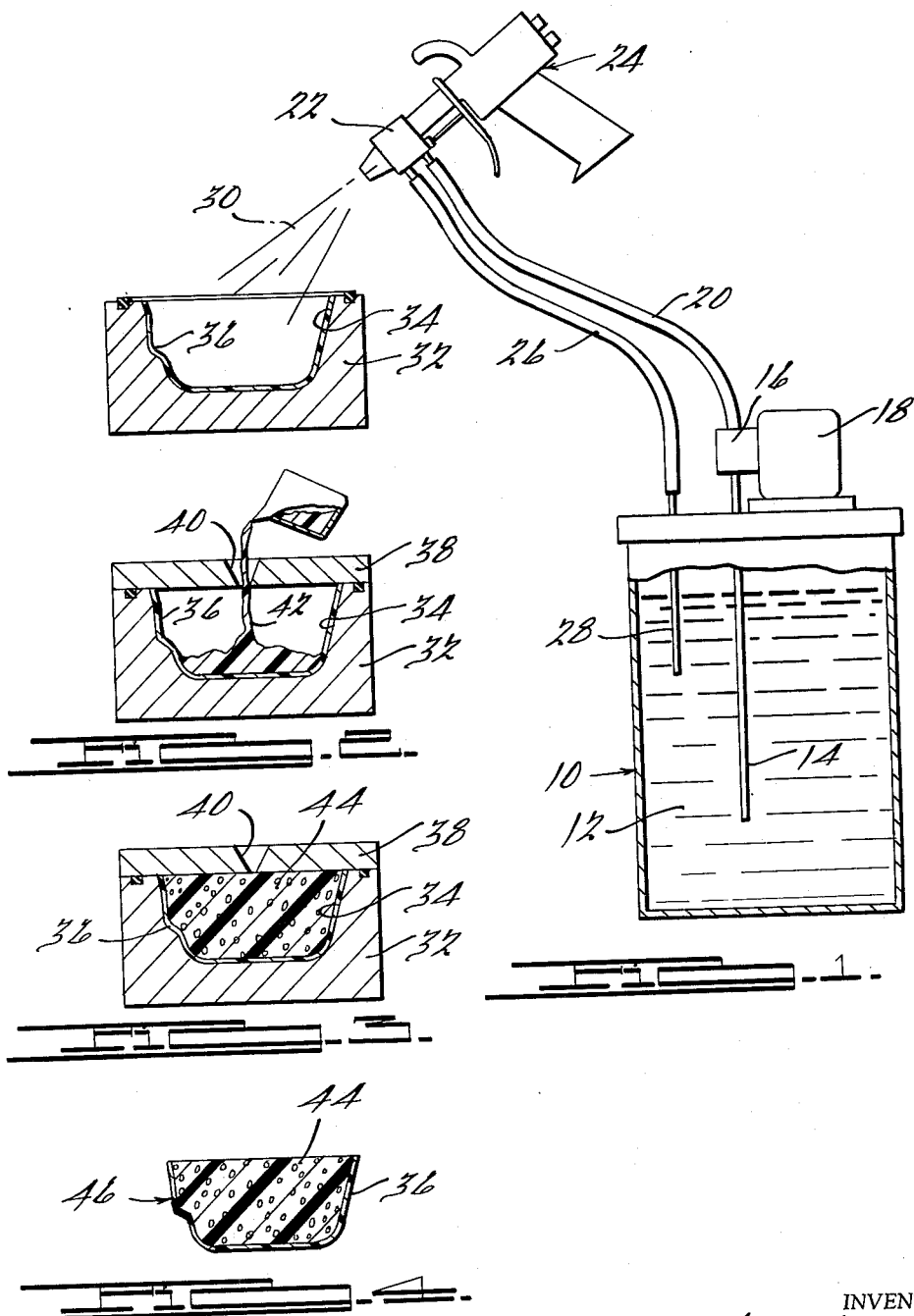

3,259,673
METHOD OF MOLDING A COMPOSITE FOAMED PLASTIC ARTICLE UTILIZING AIRLESS SPRAYING OF AN OUTER FILM FORMED FROM HEAT CURABLE MATERIALS
Lloyd J. Ericson, Keokuk, Iowa, assignor to Sheller Manufacturing Corporation, Detroit, Mich., a corporation of Indiana
Filed Oct. 9, 1961, Ser. No. 143,527
10 Claims. (Cl. 264—45)

The present invention broadly relates to an improved process for forming plastic films of a preselected contour and composite articles made therefrom and more particularly to a novel method of forming vinyl polymer films having a preselected contour which are self-sustaining in shape by the airless spraying of vinyl resins in the form of vinyl plastisols on preheated mold surfaces of the desired contour and thereafter either stripping the resultant fused vinyl film from the mold or uniting the film with a resilient or rigid core material such as, for exemple, a resinous foam, forming therewith a composite article. The novel method comprising the present invention is particularly applicable for forming cover sheets or skins and composite articles employing a resilient or rigid core integrally united with the overlying vinyl cover skin having a preselected exterior contour for use in automobile interiors including such components as automobile arm rests, sun visors, resilient covers for instrument panels, and the like.

Various molding techniques such as rotational or centrifugal casting and slush molding, for example, have heretofore been used or proposed for use for forming vinyl films of a preselected contour having sufficient thickness to provide for adequate shape retention. These and other techniques heretofore known embody one or more inherent disadvantages therein rendering them unsuitable or commercially impractical for use in a large number of instances. For example, in the conventional centrifugal or rotational casting method, vinyl plastisols in a measured quantity are inserted in a closed mold which is thereafter rotated simultaneously about a plurality of axes as the temperature of the mold is increased to effect gelation and subsequent fusion of the plastisol. The mold is thereafter opened and the finished article removed therefrom. While this method has been commercially satisfactory for molding relatively small hollow articles such as doll heads, hobby horses, and the like, the method has the inherent disadvantage of being limited with respect to the size of the object to be formed and to date has not been satisfactorily adapted for the manufacture of relatively large sized objects such as the automobile crash pads, visors, etc.

Similarly, slush molding has the disadvantages of requiring the step of removing the excess film forming material from the mold after the residuary film is formed, and moreover presents the problem when extremely intricate and complex configurations are being cast of entrapping air therein, thus forming an imperfect replica of the mold contour.

There has, accordingly, been a heretofore long felt need for an improved process whereby comparatively large sized vinyl films of a preselected contour and of a substantially uniform and controlled gauge can be efficiently and economically produced and which improved process overcomes the disadvantages present in the molding techniques heretofore known. In accordance with the practice of the improved method comprising the present invention, relatively large sized as well as small articles can now be satisfactorily produced by the airless spraying of vinyl polymerplastisols of a controlled range of viscosities under a controlled range of pressures forming therewith a resultant vinyl polymer film, the gauge of which can be readily controlled to the desired thickness so as to provide satisfactory shape retention. Prior to the discovery of the present method, it was heretofore believed impossible to spray vinyl plastisols having high viscosities within the ranges subsequently to be described without the use of solvent thinners, nor was it believed possible to effect such a spray without employing a gaseous propelling agent such as air, for example. The formation of vinyl films by utilizing air sprayed plastisols or organosols is subject to the inherent disadvantage that the resultant film contains entrapped or dissolved air in the form of minute bubbles which seriously detracts from the impervious nature of the film and the physical strength properties thereof. The incorporation of varying amounts of solvent thinners foming therewith an organosol to reduce the viscosity to a level to enable air spraying thereof as was heretofore believed necessary, in addition to the foregoing disadvantages of air spraying techniques, is further subject to the disadvantage of the shrinkage that occurs due to subsequent evaporation of the solvent thinner accompanied by the formation of minute pin holes and surface pores in the resultant vinyl film.

Spraying techniques employing air as a propellent are also characterized by the further disadvantage of the inherent tendency of such techniques to produce a so-called over-spray which fills the surrounding atmosphere resulting in a substantial waste of the plastisol in amounts frequently averaging as high as 40%, in addition to constituting, in many instances, a health hazard to operating personnel. The airless spray technique comprising the present invention substantially reduces, and in some instances, completely eliminates any over-spray which provides for improved economy and efficient usage of the plastisol as well as providing for improved working conditions and obviating the need for installing expensive and elaborate ventilating systems.

It is accordingly a principal object of the present invention to provide a unique method of forming vinyl films that supplies a heretofore unfilled need and which overcomes the disadvantages inherent in other methods heretofore known.

Another object of the present invention is to provide an improved method whereby plastisols of a controlled high viscosity range are sprayed under controlled high pressure conditions to effect fragmentation thereof enabling the fragmented pressure-propelled plastisol to be applied on a substrate having a preselected contour in a controlled thickness providing therewith a resultant film possessing the desired shape-retention characteristics.

Still another object of the present invention is to provide a unique airless spraying method of high viscosity vinyl polymer plastisols wherein substantially uniform strong films are obtained which are substantially free of any entrapped air or internal voids and which technique is eminently satisfactory for forming relatively large articles of complex and intricate contours.

A further object of the present invention is to provide an improved method of forming composite articles comprising a vinyl polymer cover film or skin of a controlled thickness and of a preselected contour disposed in overlying and bonded relationship about an internal core.

A still further object of the present invention is to provide an improved method of making vinyl polymer films having a preselected contour and composite articles employing such vinyl polymer films and which method is of simple and accurate control, and of versatile and economical operation.

The foregoing and other objects and advantages of the unique method comprising the present invention are achieved by applying a vinyl polymer plastisol having a viscosity ranging from about 1000 centipoises to about 15,000 centipoises in the form of a finely fragmented pressure-driven airless spray effected by discharging the plastisol through a nozzle under a pressure ranging from about 1200 p.s.i. up to about 2000 p.s.i. against a substrate or heated mold surface having a preselected contour in a controlled amount so as to achieve the desired thickness providing for shape retention of the resultant fused film. The resultant film can alternately be stripped from the mold after fusion or filled with a suitable rigid, semi-rigid, or flexible core material such as a polyurethane foam, for example, resulting in an integrally united composite article of the desired size and surface contour. The plastisol can incorporate additional constituents such as fillers and pigments, for example, in order to produce vinyl polymer films and composite articles of the desired decorative color and appearance.

Other objects and advantages of the process comprising the present invention, will become apparent from the following detailed description and the specific examples provided by way of further illustration, taken in conjunction with the accompanying drawings wherein:

FIGURE 1 is a schematic side elevational view partly in section of an apparatus which can be satisfactorily employed in accordance with the practice of the present invention;

FIGURE 2 is a vertical sectional view of the mold illustrated in FIGURE 1 having a mold cover plate on the upper surface thereof and illustrating the pouring of a foam reaction mixture into the mold cavity incorporating the plastisol coating on the surface of the cavity thereof;

FIGURE 3 is a vertical sectional view of the mold shown in FIGURE 2 in which the foam reaction mixture has expanded filling the interior of the mold cavity, and FIGURE 4 is a vertical sectional view of the composite article removed from the mold illustrated in FIGURE 3, comprising a foamed core integrally bonded to the vinyl cover sheet.

The plastisol or equivalent plastic material which is utilized to form the airless spray coating of the plastic film or cover skin in accordance with the practice of the method comprising the present invention can comprise vinyl polymer of the type well known in the art including polymers of vinyl chloride, vinylidene chloride and vinyl esters such as vinyl acetate, for example, or copolymers of which these monomers comprise the major constituent. Of these, the best known and most frequently employed are the vinyl chloride polymers. The plastisol is formed by creating a suspension of finely particulated vinyl polymer powder in a plasticizer or combinations of plasticizers. On subsequent heating, a gelation occurs which, on further heating, causes a fusion of the gelled plastisol effecting a diffusion of the plasticizer throughout the vinyl polymer resin particles, resulting in a coherent, integral, plasticized film or cover skin with substantially no decrease in volume.

Any one or combinations of two or more plasticizers of the types well known in the formulation of vinyl polymer plastisols can be satisfactorily employed. The selection of the specific plasticizer or blend of plasticizers employed is predicted not only on the physical and chemical characteristics of the resultant film but additionally are selected to produce a plastisol having a high viscosity within the range of from about 1000 centipoises to about 15,000 centipoises, and preferably from about 8,000 to about 10,000 centipoises, as measured with a Brookfield viscometer. The viscosity of the plastisols as herein described and as set forth in the subjoined claims, are expressed in terms of centipoises as measured by a Brookfield viscometer employing a No. 4 spindle, at 2 r.p.m., and at a plastisol temperature of about 82° F. unless otherwise indicated. Plasticizers of the type which can be satisfactorily employed include the phthalate types such as dioctyl phthalate (DOP), adipates such as dioctyl adipate, phosphates such as tricresyl phosphate (TCP), sebecates such as dioctyl sebecates, oleates, polymeric type plasticizers such as polyester plasticizers, etc. as well as combinations thereof.

In addition to the vinyl polymer and plasticizer constituent, the compounded plastisol can also incorporate suitable fillers, pigments, and stabilizers. A broad typical formulation of a plastisol suitable for use in accordance with the present invention, is listed in the following table wherein the proportions of the ingredients listed are expressed in terms of parts by weight based on 100 parts of the vinyl polymer employed:

TYPICAL PLASTISOL COMPOSITION

| Constituent: | Parts by weight |
| --- | --- |
| Vinyl polymer | 100 |
| Plasticizer(s) | 30–100 |
| Filler(s) | 0–50 |
| Pigment(s) | 0–10 |
| Stabilizer(s) | .5–5 |

As indicated in the foregoing table, the plastisol formulation can contain up to about 50 parts of filler based on 100 parts vinyl polymer and is employed as an extender and to further achieve the desired physical characteristics of the resultant fused film. An one of a number or combinations of finely particulated filler materials of a size smaller than the discharge orifice can be incorporated in the amount indicated including calcium carbonate, clays, mica, etc. In addition, finely particulated pigments of the types well known in the art as useful in plastisol compounding can be employed in amounts up to about 10 parts by weight per 100 parts vinyl polymer to impart the desired decorative color to the resultant film. Pigments suitable for imparting color to vinyl polymer plastisols that are well known in the art include, for example, white titanium dioxide, black super carbovar available from Godfrey L. Cabot, Inc.; green pigments such as resinated phthalocyanine green G–5025, resanine blue B–4703, pyrazolone red R–6258, benzidine yellow YB–2, available from B. F. Goodrich Chemical Co.; chrome yellow available from Kentucky Color & Chemical Co.; molybdenate orange from Imperial Paper & Color Corp.; etc.

In addition to the foregoing, from about .5 up to about 5 parts by weight of a suitable stabilizer or combinations of stabilizers, of the types well known in the art for plastisol compounding are incorporated in the plastisol formulation to minimize heat and light deterioration of the resultant film. Lead compounds are commonly employed in opaque films and tin complexes or barium-cadmium-chelating-epoxy systems are usually employed in clear vinyl films.

The plastisol composition is simply prepared by conventional mixing techniques preferably employing relatively high shear mixing equipment. It is generally preferred to add the stabilizer to the plasticizer or blend of plasticizers and thereafter add the vinyl polymer and filler constituent gradually during continued mixing until a substantially uniform homogeneous blend is obtained. Thereafter, the appropriate proportion of pigments preferably in the form of a mixture with additional plasticizer, are added and mixed until a homogeneous pigmented plastisol is obtained which is characterized in appearance as a smooth, creamy, heavy bodied liquid having a viscosity broadly ranging from about 1000 centipoises up to about 15,000 centipoises.

The resultant plastisol can thereafter be applied in accordance with the airless spray technique comprising the present invention in the form of a finely fragmented pressure driven spray against a heated substrate or mold surface having a preselected contour forming therewith a film of the desired controlled thickness. Because of the high viscosity of the plastisol, conventional spray techniques cannot be employed. In order to effect fragmentation of the heavy bodied plastisol having a viscosity within the above range, extremely high pressures, namely, pressures ranging from about 1200 p.s.i. up to about 2000 p.s.i. are necessary to effect a discharge of the plastisol through a nozzle orifice providing concurrent fragmentation of the plastisol into fine sized droplets in the form of a uniform spray pattern and propelling the resultant fragmented droplets against the surface of a heated mold or pattern. The specific pressure necessary to effect the desired spray characteristics is dependent on the viscosity of the plastisol and the specific spray pattern desired to achieve optimum application of the fragmented spray on the mold surface. Pressures of about 1200 p.s.i. are generally sufficient to achieve a satisfactory fragmentation and spray pattern of plastisols having a viscosity of about 1000 centipoises at room temperature. The airless spraying of plastisols having viscosities less than about 1000 centipoises cause difficulty because of excessive over-spray and mold run-off resulting in films having a nonuniform gauge as well as insufficient strength and shape retention due to excessive amount of plasticizer used. On the other hand, plastisol viscosities of above about 15,000 centipoises prevent attainment of satisfactory airless-spray patterns to achieve uniformity in gauge thickness and smoothness of the film, and more frequently causes erratic operation and eventual plugging of the nozzle orifice. When plastisols having viscosities greater than 1000 centipoises are used, correspondingly higher pressures up to about 2000 p.s.i. are employed which may also be accompanied with a preheating of the plastisol. While a maximum pressure of about 2000 p.s.i. is not critical in order to achieve the benefits of the present invention, pressures in excess of about 2000 p.s.i. do not provide any particular additional benefits and in many cases prevent attainment of uniformity of gauge of the film due to puddling and run-off and excessive over-spray of the plastisol.

It is sometimes desirable to preheat the plastisol prior to spraying to a temperature ranging from about room temperature (70°) up to a temperature below that at which gelation of the plastisol will occur. Preheating of the plastisols constitutes a preferred practice whereby spray patterns are obtained having optimum characteristics providing for resultant films which are of uniform gauge and surface smoothness. The preheating of the plastisol can conveniently be achieved in the spray equipment prior to discharge through the nozzle orifice. In view of the fact that the gelation temperature of the plastisol is dependent on the specific formulation employed which broadly ranges from about 120° F. up to about 240° F. and more usually from about 140° F. up to about 200° F., when the plastisol is to be preheated prior to spraying, it is preferred to employ plastisol preheat temperatures of around 120° F. The preheating of plastisols having a viscosity ranging from about 8000 to about 10,000 centipoises to a temperature of about 120° F. constitutes the preferred condition which normally requires a pressure ranging from about 1800 to about 2000 p.s.i.

The specific design of the spray equipment employed for fragmentizing and spraying the plastisol is not critical provided that the orifice in the nozzle is of the proper size relative to the range of pressures and the range of viscosities of the plastisol as hereinbefore set forth to achieve proper fragmentation of the plastisol into a substantially uniform spray pattern of fine-sized droplets. Orifice sizes of from about 0.010 to about 0.020 inch, for example, have been found to be particularly suitable. The spray equipment preferably employs means for constantly recirculating the plastisol during periods between actual spraying to avoid fouling of the conduits and assures that the plastisol is maintained at the appropriate preselected temperature at the discharge nozzle. A number of spray devices are commercially available which provide for satisfactory spraying of the plastisol under the conditions as hereinbefore set forth providing therewith substantially uniform homogeneous vinyl polymer films. One such spray device is commercially available from the Spee-Flo Company, of Houston, Texas which has been satisfactorily employed. Various nozzle designs can be employed to achieve the desired fan-shaped configuration of the resultant fragmented airless spray pattern.

A spray apparatus in accordance with the foregoing description is illustrated in FIGURE 1 of the drawings, and comprises a storage tank 10 in which a quantity of plastisol 12 is contained and is withdrawn therefrom by a suction line 14 connected to the inlet side of a combination pump and heater unit 16 driven by a motor 18. The plastisol preheated to an appropriate temperature and under a prescribed pressure, is transferred from the outlet side of the pump through an input conduit 20 to the nozzle portion 22 of a suitable spray gun 24. The excess quantity of the plastisol supplied to the spray gun is returned to the storage tank 10 by means of a return conduit 26 connected to a return pipe 28 extending into the interior of the storage tank. The airless fragmented plastisol spray indicated at 30 in FIGURE 1, discharged from the nozzle portion 22, is directed toward a heated mold 32 having a mold cavity indicated at 34 on which a plastisol coating 36 is deposited.

The mold surface on which the plastisol spray is applied can be of any regularly or irregularly shaped configuration including complex configurations such as encountered in automobile arm rest designs. The mold is preheated to a temperature ranging from about 180° F. up to about 400° F. and preferably from about 280° F. up to about 400° F. The minimum mold preheat temperature that is usable is dictated by the gelation temperature of the plastisol spray applied thereto and is maintained above the gelation temperature so as to promote gelation of the fine-sized spray droplets on coming in contact therewith. The gelation of the plastisol spray on striking the heated mold surface prevents any runs, drips, or other unintentional surface irregularities from occurring enabling two or more over-sprays to be applied to the mold surface until the desired controlled thickness of the film is obtained. By virtue of the controlled viscosity of the plastisol and the controlled high pressure fragmentation spraying thereof, the resultant deposited film is substantially devoid of any entrapped air therein which, on subsequent fusion, forms a dense impervious film or cover skin having the desired physical properties and shape retention characteristics.

Fusion of the gelled film is achieved during a post cure by heating the mold to a temperature below that at which thermal degradation of the plastisol film will occur and preferably from about 360° F. to about 400° F. for a period of time sufficient to effect substantially complete diffusion of the plasticizer constituent into the finely particulated solid vinyl polymer particles effecting therewith fusion into a substantially uniform homogeneous film structure. On completion of the fusion step, the mold is allowed to cool to a temperature preferably less than about 250° F. and the film having a preselected contour therein corresponding to the mold surface is then simply stripped therefrom.

In the formation of composite articles comprising an exterior vinyl polymer film of the type hereinbefore described, which is disposed in overlying relationship about an inner core, the fusion step of the gelled plastisol film can be delayed until a suitable core material such as a cellular plastic, for example, is applied to the interior of the gelled film and concurrent curing of the core material and fusion of the film can subsequently be achieved simultaneously.

Any one of a number of suitable materials can be employed as a core for making composite articles and preferably expanded or cellular plastics are employed either of a rigid, semi-rigid, or flexible nature which are formed in situ within the gelled or completely fused film effecting concurrent foaming and bonding to the interior surface thereof. For example, plastisols incorporating suitable blowing agents, polyvinyl chloride foams, polyurethane foams, natural and synthetic rubber foams, polystyrene, cellulose acetate, phenol formaldehyde and urea formaldehyde foams and the like can be employed to form a light-weight core over which the vinyl polymer film having a preselected contour is disposed.

In the specific use of the composite articles such as in sun visors, resilient covers for instrument panels and arm rests as soft trim components of passenger cars, semi-rigid and flexible polyurethane foams are particularly satisfactory in that they form composite articles possessing resilient shock absorbing properties promoting the safety of the driver and occupants of the vehicle. Polyurethane foams employing conventional poly-functional resins such as polyester and polyether resins in combination with polyisocyanate reactants such as tolylene di-isocyanate, for example, are particularly satisfactory inasmuch as they can be foamed in situ within the interior of the vinyl polymer film and cured at the temperatures employed for fusing the gelled film without causing any thermal degradation of the film. In the formation of padded sun visors, for example, the vinyl polymer plastisol can be applied to the female surfaces of a pair of matched molds forming a homogeneous film of the desired thickness to provide shape retention. The two mold halves, after gelation or after fusion of the plastisol, can thereafter be placed in mating relationship forming a cavity into which a controlled quantity of a polyurethane reactant mixture is added and foamed in situ completely filling the interior cavity between the exterior cover skin and simultaneously integrally bonding the exterior skin and core into an integral unit. On completion of curing of the foam and fusion of the vinyl polymer skin, the composite article can be simply tripped from the mold and any excess foam and cover skin flashing trimmed therefrom providing therewith a finished product. Alternately, the plastisol can be applied to the surfaces of a female mold forming a vinyl polymer film and after gelation or fusion of the film, a cover plate can be applied over the mold having an inlet therein through which the foam reactant composition is added and allowed to expand to completely fill the interior of the cavity and bond to the fused vinyl polymer skin forming therewith a composite article having the desired contour.

The foregoing embodiment is illustrated in FIGURES 2–4 of the drawings wherein the mold 32 having the plastisol coating 36 of a preselected thickness and configuration on the surface of the cavity 34 thereof, is subsequently closed by means of a mold cover plate 38 formed with an inlet 40 through substantially the center thereof. A suitable foam reaction mixture 42 is poured into the interior of the cavity and is subsequently allowed to react and expand so as to completely fill the interior of the cavity.

At the completion of the expansion of the foam reaction mixture, as illustrated in FIGURE 3, and upon subsequent substantially complete curing thereof, the mold cover plate 38 is removed from the top of the mold 32 and the composite article is extracted comprising a foamed core 44 integrally bonded to the interior surface of the plastisol coating or skins 36. The resultant composite article indicated at 46 is illustrated in FIGURE 4.

The following examples are provided to further illustrate the composition and technique of forming vinyl films and composite articles comprising a vinyl polymer cover skin and a foamed core. It will be understood, however, that these examples are provided by way of further illustration and are not intended to limit the scope of the invention as set forth in the subjoined claims.

*Example I*

A plastisol was compounded having the following composition:

| Ingredient: | Parts by weight |
|---|---|
| Vinyl chloride polymer [a] | 80 |
| Polyvinyl chloride-vinylidene chloride copolymer resin [b] | 20 |
| Polyester type plasticizer [c] | 10 |
| Epoxy alkyl phthalate type monomeric plasticizre [d] | 30 |
| Phthalate type monomeric plasticizer [e] | 25 |
| Barium-cadmium-zinc powder stabilizer [f] | 2 |
| Liquid non-metalic auxiliary stabilizer [g] | .5 |
| Total | 167.5 |

[a] Marvinol V.R.–50 plastisol grade straight polyvinyl chloride resin, general purpose, from Naugetuck Chemical Company.
[b] Geon 202, plastisol grade polyvinyl chloride-vinylidene chloride copolymer resin, from B. F. Goodrich Chemical Company.
[c] Paraplex G–54, polyester type plasticizer, from Rohm & Haas Co.
[d] Monoplex S–74, epoxy alkyl phthalate type monomeric plasticizer, from Rohm & Haas Co.
[e] Flexol 10–10, di-decyl-phthalate monomeric plasticizer from Union Carbide Chemical Company.
[f] Advastab BC–27, powdered barium-cadmium-zinc heat and light stabilizer, from Advance Solvents & Chemical Co.
[g] Advastab CH–300, non-metallic auxiliary heat and light stabilizer, liquid, from Advance Solvents & Co.

The plastisol was prepared by first adding the plasticizer and stabilizer constituents to a Champion-type dough mixer and thereafter the powdered vinyl polymer resins were slowly added during continued agitation. The addition of the resin was completed in approximately ten minutes and thereafter agitation was continued for an additional 30 minutes at which time a substantially homogenous fluid plastisol was obtained. An aliquot portion of the above plastisol was thereafter placed in a Hobart planetary gear-type mixer and blended with a titanium dioxide white pigment designated as HSC 930 White and available from Harwich Standard Chemical Company, which was dispersed in a Paraplex G–62 plasticizer of the polyester type obtained from Rohm & Haas Co. in the proportions of 70% titanium dioxide and 30% plasticizer. The dispersion was added to the plastisol in an amount of 6 parts per 100 parts by weight of the plastisol. Mixing was continued until a white plastisol having the appearance of a smooth, creamy, heavy-bodied liquid was produced having a viscosity as established by a Brookfield viscometer employing a No. 4 spindle and at a temperature of 82° F. of 9000 centipoises at 2 r.p.m.

A copper-nickel mold having a cavity therein in the form of a typical automobile crash pad having a grained textured surface was preheated to a temperature of 280° F. and sprayed with the plastisol prepared in accordance with Example I, at a temperature of 120° F. and under a pressure of 1800 p.s.i. employing an airless spray gun obtained from the Spee-Flow Company having a nozzle orifice therein of 0.015 inch. During the application of the plastisol spray, the finely fragmented particles were observed to gel on coming in contact with the surfaces of the mold providing a substantially smooth surface finish and without incurring any running or sagging of the plastisol film. The desired thickness of the film was achieved by applying a series of overlapping passes of the spray pattern to the mold surface. The gelled vinyl polymer film and mold were thereafter heated in an oven to a temperature of 400° F. for a period of 30 minutes to effect substantially complete fusion of the vinyl polymer film. At the completion of the fusion cycle, the mold was cooled with water to a temperature of about 150° F.

A mold plate was thereafter fastened to the mold closing the vinyl-polymer film-coated cavity thereof and a urethane foam reaction mixture of a composition hereinafter set forth was poured into the closed cavity and the mold placed in an oven and maintained at a temperature of 150° F. for a period of 20 minutes. The mold was thereafter removed from the oven and permitted to cool to room temperature after which the mold plate was removed and the composite crash pad was stripped from the mold. The resultant composite article was characterized as having an exterior vinyl polymer cover sheet of substantially uniform gauge having a surface structure comprising an exact replica of the texture of the mold surface cavity and a cellular core tenaciously bonded to the entire interior surface thereof.

The polyurethane reactant mixture employed in making the foregoing composite crash pad article was of the following composition:

POLYURETHANE COMPOSITION

| Component A: | Parts by weight |
|---|---|
| Prepolymer | 100 |
| Silicone fluid (DC 200, Dow Corning Corp.) | 0.4 |
| Component B: | |
| N-methylmorpholine (Union Carbide) | 1.0 |
| Triethylamine (Jefferson Chemical Co.) | 0.2 |
| Water | 2.3 |

The prepolymer constituents as set forth in the foregoing table comprises the reaction mixture of 100 parts by weight of Tetronic polyol 701 which is available from Wyandotte Chemical Corporation and comprises a polymer prepared from propylene and ethylene oxide using ethylene diamine as the starting nucleus and 39.2 parts by weight of tolylene di-isocyanate comprising an 80–20 mixture of the 2,4 and 2,6 isomers. The reactions of the di-isocyanate and polyol was achieved at a temperature of 70° C. for a period of about 1½ hours during which only 12.2 parts by weight of the di-isocyanate were employed. At the completion of the initial reaction, at which time a viscosity of about 8000 centipoises measured at 25° C. was attained, the remaining di-isocyanate was added and the reaction under agitation was continued for an additional one-half hour. The prepolymer was thereafter rapidly cooled to below 50° C. and was characterized as having a viscosity of about 6500 centipoises at 25° C. and a free NCO content of from about 8.9% to about 9.1%. The foam reactant mixture is prepared by quickly mixing components A and B together and putting them into the mold cavity as hereinbefore described.

*Example II*

A plastisol was compounded having the following composition:

| Ingredient: | Parts by weight |
|---|---|
| Vinyl chloride polymer [a] | 70 |
| Polyvinyl chloride-vinylidene chloride copolymer [b] | 30 |
| Phthalate type monomeric plasticizer [c] | 30 |
| Epoxy type plasticizer [d] | 10 |
| Adipate plasticzer [e] | 15 |
| Barium-zinc stabilizer [f] | 1.5 |
| Cadmium stabilizer [g] | 1.5 |
| Total | 158.0 |

[a] Geon 121, plastisol grade straight polyvinyl chloride resin, general purpose, from B. F. Goodrich Chemical Co.
[b] Geon 202, plastisol grade polyvinyl chloride-vinylidene chloride copolymer resin, from B. F. Goodrich Chemical Co.
[c] Flexol 10–10, di-decylphthalate monomeric plasticizer, from Union Carbide and Chemical Company.
[d] Monoplex S–73, low viscosity epoxy plasticizer from Rohm & Haas Co.
[e] Di-octyl adipate plasticizer, G.P.–233, from B. F. Goodrich Chemical Co.
[f] Advastab BZ–51, barium-zinc liquid stabilizer, from Advance Solvents & Chemical Co.
[g] Advastab C–77 liquid cadmium stabilizer, from Advance Solvents & Chemical Co.

The above ingredients were mixed in accordance with the mixing technique as set forth in Example I over a period of 30 minutes until a smooth, creamy, heavy bodied liquid was produced having a viscosity as determined by a Brookfield viscometer of 2500 centipoises employing a No. 4 spindle at a speed of 2 r.p.m. and at a temperature of 82° F.

The resultant plastisol was sprayed at room temperature on the copper nickel mold described in Example I which was preheated to a temperature of 300° F. employing the Spee-Flo airless spray gun as set forth in the preceding example at pressures ranging from 1300 p.s.i. up to 2000 p.s.i. Satisfactory spray patterns were achieved in each case and the resultant films formed were characterized as substantially smooth and of uniform gauge without the presence of any surface irregularities or imperfections therein. Unsatisfactory and erratic spray patterns as well as orifice plugging were encountered at pressures less than about 1200 p.s.i. The resultant films were thereafter fused by placing the mold and gelled film thereon in an oven and heated to a temperature of 400° F. for a period of 30 minutes during which substantially complete fusion of the film was obtained. The mold was thereafter cooled with water to a temperature of about 150° F. and the plastisol film stripped therefrom.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. The method of forming a composite article having an impervious resinous film of a preselected contour on the exterior thereof and a core tenaciously bonded to the inner surface of said film which comprises the steps of providing a vinyl polymer plastisol having a viscosity ranging from about 1000 centipoises to about 15,000 centipoises, fragmenting said plastisol into a plurality of fine-sized droplets by forcing said plastisol through a nozzle under a pressure ranging from about 1200 p.s.i. to about 2000 p.s.i., directing the fragmented said plastisol against a mold surface of a preselected contour, said mold surface having a temperature in the range of about 180° F. to about 400° F. forming thereby a substantially uniformly gelled film thereon, controlling the quantity of the fragmented said plastisol directed toward said mold surface so as to achieve the desired thickness of said film, heating said gelled film at a temperature below that at which thermal degradation of the film will occur for a period of time sufficient to effect substantially complete fusion of said plastisol forming therewith a substantially integral homogeneous film, and thereafter tenaciously bonding a core material to the interior of said film, forming therewith said composite article.

2. The method of forming a composite article having an impervious resinous film of a preselected contour on the exterior thereof and a core tenaciously bonded to the inner surface of said film which comprises the steps of providing a vinyl polymer plastisol having a viscosity ranging from about 1000 centipoises up to about 15,000 centipoises at a temperature ranging from about room temperature up to a temperature below the gelation temperature of said plastisol, fragmenting said plastisol into a plurality of fine-sized droplets by forcing said plastisol through a nozzle under a pressure ranging from about 1200 p.s.i. up to about 2000 p.s.i., directing the fragmented said plastisol against a mold surface having a preselected contour, said mold surface having a temperature in the range of about 180° F. to about 400° F. thereby forming a substantially uniformly gelled film of said plastisol thereon, controlling the quantity of the fragmented said plastisol directed toward said mold surface so as to achieve the desired thickness of said film, heating said gelled film at a temperature up to about 400° F. for a period sufficient to effect substantially complete fusion of said plastisol forming therewith a substantially integral homogeneous film, and thereafter tenaciously bonding a core material to the interior of said film forming therewith said composite article.

3. The method of forming a composite article having an impervious resinous film of a preselected contour on the exterior thereof and a core tenaciously bonded to the inner surface of said film which comprises the steps of providing a vinyl polymer plastisol having a viscosity ranging from about 1000 centipoises up to about 15,000 centipoises at a temperature ranging from about room temperature up to a temperature below the gelation temperature of said plastisol, fragmenting said plastisol into a plurality of fine-sized droplets by forcing said plastisol through a nozzle under a pressure ranging from about 1200 p.s.i. up to about 2000 p.s.i., directing the fragmented said plastisol against a mold surface having a preselected contour, said mold surface having a temperature in the range of about 180° F. to about 400° F. thereby forming a substantially uniformly gelled film of said plastisol thereon controlling the quantity of the fragmented said plastisol directed toward said mold surface so as to achieve the desired thickness of said film, heating said gelled film at a temperature up to about 400° F. for a period sufficient to effect substantially complete fusion of said plastisol forming therewith a substantially integral homogeneous film, and thereafter applying a resinous foam reactant mixture to the interior of said film which on foaming in situ and subsequent curing is tenaciously bonded to the interior surface of said film.

4. The method of forming a composite article having an impervious resinous film of a preselected contour on the exterior thereof and a core tenaciously bonded to the inner surface of said film which comprises the steps of providing a vinyl polymer plastisol having a viscosity ranging from about 1000 centipoises up to about 15,000 centipoises at a temperature ranging from about room temperature up to a temperature below the gelation temperature of said plastisol, fragmenting said plastisol into a plurality of fine-sized droplets by forcing said plastisol through a nozzle under a pressure ranging from about 1200 p.s.i. up to about 2000 p.s.i., directing the fragmented said plastisol against a mold surface having a preselected contour, said mold surface having a temperature in the range of about 180° F. to about 400° F. thereby forming a substantially uniformly gelled film of said plastisol thereon controlling the quantity of the fragmented said plastisol directed toward said mold surface so as to achieve the desired thickness of said film, heating said gelled film at a temperature up to about 400° F. for a period sufficient to effect substantially complete fusion of said plastisol forming therewith a substantially integral homogeneous film, and thereafter applying a polyurethane foam reactant mixture to the interior of said film which on foaming in situ and subsequent curing is tenaciously bonded to the interior surface of said film.

5. The method of forming a composite article having an impervious resinous film of a preselected contour on the exterior thereof and a core tenaciously bonded to the interior surface of said film which comprises the steps of providing a vinyl polymer plastisol having a viscosity ranging from about 1000 centipoises up to about 15,000 centipoises at a temperature of about 120° F., fragmenting said plastisol into a plurality of fine-sized droplets by forcing said plastisol through a nozzle under a pressure ranging from about 1200 p.s.i. up to about 2000 p.s.i., directing the fragmented said plastisol against a mold surface having a preselected contour, said mold surface having a temperature in the range of about 280° F. to about 400° F. thereby forming a substantially uniformly gelled film of said plastisol thereon, controlling the quantity of the fragmented said plastisol directed to said mold surface so as to achieve the desired thickness of said film, heating said gelled film at a temperature up to about 400° F. for a period of time sufficient to effect substantially complete fusion of said plastisol forming therewith a substantially integral homogeneous film, and thereafter applying a polyurethane foam reactant mixture to the interior of said film which on foaming in situ and subsequent curing is tenaciously bonded to the interior surface of said film.

6. The method of forming an impervious resinous film having a preselected contour which comprises the steps of providing a vinyl polymer plastisol having a viscosity ranging from about 1000 centipoises to about 15,000 centipoises, fragmenting said plastisol into a plurality of fine-sized droplets by forcing said plastisol through a nozzle under a pressure ranging from about 1200 p.s.i. to about 2000 p.s.i., directing the fragmented said plastisol against a mold surface of a preselected contour, said mold surface having a temperature in the range of about 180° F. to about 400° F. forming thereby a substantially uniformly gelled film thereon, controlling the quantity of the fragmented said plastisol directed toward said mold surface so as to achieve the desired thickness of said film, and thereafter heating said gelled film at a temperature below that at which thermal degradation of the film will occur for a period of time sufficient to effect substantially complete fusion of said plastisol forming therewith a substantially integral homogeneous film.

7. The method of forming an impervious resinous film having a preselected contour which comprises the steps of providing a vinyl polymer plastisol having a viscosity ranging from about 1000 centipoises up to about 15,000 centipoises at a temperature ranging from about room temperature up to a temperature below the gelation temperature of said plastisol, fragmenting said plastisol into a plurality of fine-sized droplets by forcing said plastisol through a nozzle under a pressure ranging from about 1200 p.s.i. up to about 2000 p.s.i., directing the fragmented said plastisol against a mold surface having a preselected contour, said mold surface having a temperature in the range of about 180° F. to about 400° F. thereby forming a substantially uniformly gelled film of said plastisol thereon, controlling the quantity of the fragmented said plastisol directed toward said mold surface so as to achieve the desired thickness of said film, and thereafter heating said gelled film at a temperature up to about 400° F. for a period of time sufficient to effect substantially complete fusion of said plastisol forming therewith a substantially integral homogeneous film.

8. The method of forming an impervious resinous film having a preselected contour which comprises the steps of providing a vinyl polymer plastisol having a viscosity ranging from about 1000 centipoises up to about 15,000 centipoises at a temperature ranging from about room temperature up to a temperature below the gelation temperature of said plastisol, said plastisol having a composition as set forth below in parts by weight:

| | |
|---|---|
| Vinyl polymer | 100 |
| Plasticizers | 30–100 |
| Fillers | 0–50 |
| Pigment | 0–10 |
| Stabilizers | .5–5 | fragmenting said plastisol into a plurality of fine-sized droplets by forcing said plastisol through a nozzle under a pressure ranging from about 1200 p.s.i. up to about 2000 p.s.i., directing the fragmented said plastisol against a mold surface having a preselected contour, said mold surface having a temperature in the range of about 180° F. to about 400° F. thereby forming a substantially uniformly gelled film of said plastisol thereon, controlling the quantity of the fragmented said plastisol directed toward said mold surface so as to achieve the desired thickness of said film, and thereafter heating said gelled film at a temperature up to about 400° F. for a period of time sufficient to effect substantially complete fusion of said plastisol forming therewith a substantially integral homogeneous film.

9. The method of forming an impervious resinous film having a preselected contour which comprises the steps of providing a vinyl polymer plastisol having a viscosity ranging from about 1000 centipoises up to about 15,000 centipoises at a temperature of about 120° F., fragmenting said plastisol into a plurality of fine-sized droplets by forcing said plastisol through a nozzle under a pressure ranging from about 1200 p.s.i. up to about 2000 p.s.i., directing the fragmented said plastisol against a mold surface having a preselected contour, said mold surface having a temperature in the range of about 280° F. to about 400° F. thereby forming a substantially uniformly gelled film of said plastisol thereon, controlling the quantity of the fragmented said plastisol directed toward said mold surface so as to achieve the desired thickness of said film, and thereafter heating said gelled film at a temperature up to about 400° F. for a period of time sufficient to effect substantially complete fusion of said plastisol forming therewith a substantially integral homogeneous film.

10. The method of forming an impervious resinous film having a preselected contour which comprises the steps of providing a vinyl polymer plastisol having a viscosity ranging from about 8000 centipoises up to about 10,000 centipoises at a temperature ranging from about room temperature up to a temperature below the gelation temperature of said plastisol, fragmenting said plastisol into a plurality of fine-sized droplets by forcing said plastisol through a nozzle under a pressure ranging from about 1800 p.s.i. up to about 2000 p.s.i., directing the fragmented said plastisol against a mold surface having a preselected contour, said mold surface having a temperature in the range of about 280° F. to about 400° F. thereby forming a substantially uniformly gelled film of said plastisol thereon, controlling the quantity of the fragmented said plastisol directed toward said mold surface so as to achieve the desired thickness of said film, and thereafter heating said gelled film at a temperature up to about 400° F. for a period of time sufficient to effect substantially complete fusion of said plastisol forming therewith a substantially integral homogeneous film.

References Cited by the Examiner

UNITED STATES PATENTS

| Re. 24,351 | 8/1957 | Varela | 18—47 XR |
| 2,754,228 | 7/1956 | Bede | 117—105.1 |
| 2,772,194 | 11/1956 | Fisher et al. | |
| 2,845,997 | 8/1958 | Waite. | |
| 2,893,063 | 7/1959 | Hoppe | 18—47 XR |
| 2,948,651 | 8/1960 | Waag. | |
| 3,078,505 | 2/1963 | Mitten | 264—45 XR |

OTHER REFERENCES

Modern Plastics, "It's done with plastisols," vol. 29, No. 4, December 1951, p. 191.

ALEXANDER H. BRODMERKEL, *Primary Examiner.*

WILLIAM J. STEPHENSON, *Examiner.*

C. N. SHANE, P. E. ANDERSON, *Assistant Examiners.*